April 17, 1951     C. A. SHORT, SR     2,549,395
SUNGLARE SCREEN FOR ATTACHMENT TO
REARVIEW MIRROR ARMS
Filed June 13, 1949
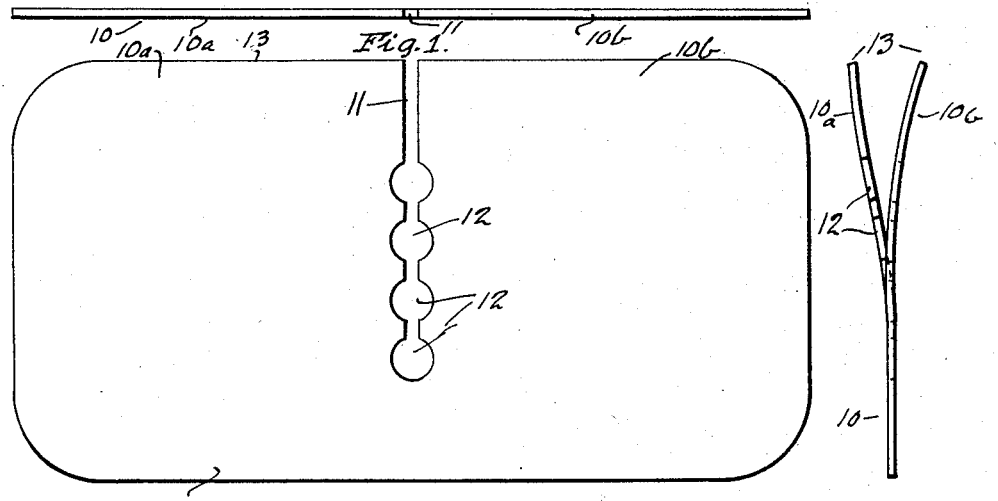
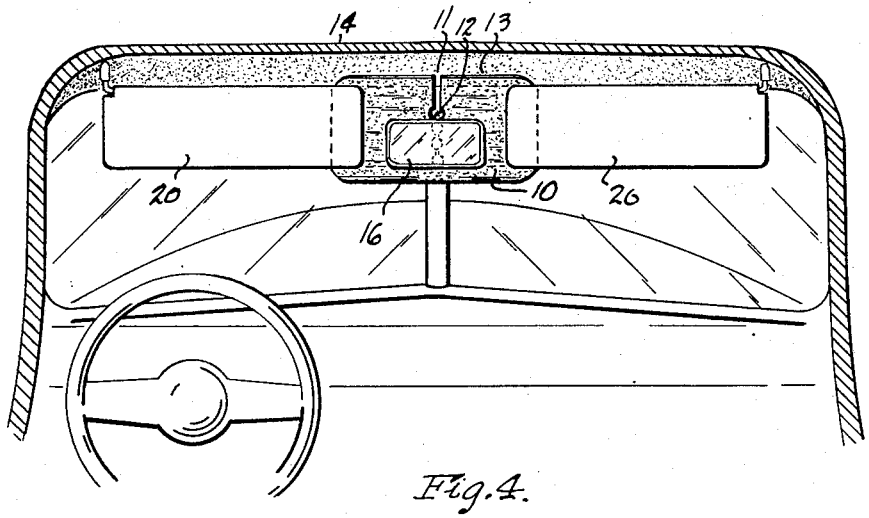
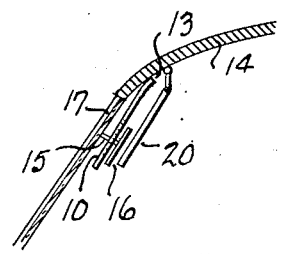
Inventor
Charles A. Short Sr.
Wooster & Davis Attorneys.

Patented Apr. 17, 1951

2,549,395

UNITED STATES PATENT OFFICE 2,549,395

SUN GLARE SCREEN FOR ATTACHMENT TO REARVIEW MIRROR ARMS

Charles A. Short, Sr., Stamford, Conn.

Application June 13, 1949, Serial No. 98,733

5 Claims. (Cl. 296—97)

This invention relates to a novel auxiliary sunvisor to bridge the gap between the two sun visors usually found in modern automobiles, trucks and other vehicles.

Most automobiles are equipped at the factory with a pair of adjustable sun visors attached to the roof or upper part of the windshield frame. These conventional sun visors are generally spaced some distance apart and the rear view mirror is generally mounted between these visors on a post which divides the windshield, or in the case of one-piece windshields the mirror is mounted on the upper part of the windshield frame or the interior roof portion adjacent the top of the windshield. In either case, the old visor devices leave a gap between them, and considerable area around the rear view mirror and between the conventional visors is unprotected against glare.

It is the main object of my invention to provide a simple but effective adjustable device for protecting the eyes of the driver and other front seat passengers from the discomfort and possible danger of glare from sunlight, bright headlights and the like, coming in through that portion of the windshield around the rear view mirror not ordinarily covered by the usual single or double sun visors with which motor vehicles are ordinarily equipped.

With the foregoing and other objects in view, I have devised the construction illustrated in the accompanying drawing forming a part of this specification. It is, however, to be understood the invention is not limited to the specific details of construction and arrangement shown, but may embody various changes and modifications within the scope of the invention.

In this drawing:

Fig. 1 is a side view of my device;

Fig. 2 is a plan view;

Fig. 3 is an end view;

Fig. 4 is a view of the device in operating position, and

Fig. 5 is another view of the device in operating position and its relation to the rear view mirror, windshield and roof.

A flat rectangularly shaped piece of material 10, preferably of translucent or opaque resilient plastic, of a length sufficient to bridge and overlap the gap between the conventional sun visors 20 and of a width substantially wider than the width of the ordinary visor, is provided with a narrow slot 11 beginning at the top edge at the center and running transversely for about ¾ of the width of the material and terminating in one of several circular apertures 12, substantially dividing the material into two partially connected halves 10a and 10b. The other circular apertures 12 are disposed along the slot. All of the circular apertures are of suitable size to make a good fit around the stud 15 which supports and connects the rear view mirror 16 to the interior of the vehicle 17.

As can be seen in Fig. 3, the two sections 10a and 10b can be partially divided at the slot and bent in opposite directions.

The upper longitudinal portion along edge 13 may be bent to conform to the contour of the roof of the vehicle 14, as shown in Fig. 5.

In operation, the slot 11 of the device is slipped over the stud 15 of the rear view mirror 16 until one of the apertures 12 engages the stud. This can be done by bending the opposite side portions 10a and 10b in opposite directions, as shown in Fig. 3, to open up the slot 11 as it is of less width than the diameter of the rear view mirror stud 15. Adjustment for desired position is easily accomplished by selecting the aperture resulting in best adjustment. Resiliency of the material keeps the device flat after it is in position and so that it is held and supported by the stud.

If the device has a tendency to pivot on the mirror stud this is prevented by edge 13 contacting the roof portion and acting as a stop. The front upper portion of the device can also be bent to rest firmly against the top of the windshield frame or the front downwardly curved portion of the roof. The device can be turned to various angles away from the normally horizontal position to prevent glare from some particular section.

As can be seen, my device does not interfere with adjustment or use of the rear view mirror or conventional visors, and the adjustment or use of the rear view mirror or conventional visors does not materially interfere with the use of my device.

Although the device is preferably made of plastic material, suitably colored to prevent glare, it may be made of various other materials as desired, such, for example, as metal, cardboard, or wood, or the like. The device can be easily and quickly mounted in position or removed.

Serious accidents have been known to be caused by the sun suddenly coming in through the gap between the two regular or conventional visors 20 and blinding the driver. This simple device very effectively overcomes this danger.

Having thus set forth the nature of my invention, I claim:

1. An auxiliary sun visor for automobiles, trucks, and other motor vehicles, comprising a rectangularly shaped flat piece of translucent resilient plastic of adequate length to bridge the space between a pair of conventional sun visors mounted in position on a vehicle, and of a width substantially larger than the width of the conventional visors, said piece having a slot in its approximate center beginning at one of its longitudinal edges and running transversely to and terminating in a circular aperture inwardly of the opposite longitudinal edge, said material having a plurality of similar circular apertures spaced along the slot, the apertures being of suitable size to frictionally engage the periphery of the connecting stud attached to the back of a rear view mirror, and said material being shaped along its upper longitudinal side to conform to the contour of the roof portion of the vehicle near the top of the windshield.

2. A visor for the prevention of glare to be used in combination with the rear view mirror of automobiles, trucks and the like comprising a rectangularly shaped flat resilient material having a slot beginning at the approximate center of one of its longitudinal sides and running transversely for most of the width of the material and terminating in an aperture slightly larger than the slot, and having several similar apertures spaced along the path of the slot, the size of the apertures being adapted to engage the stud which connects the rear view mirror of the vehicle with the vehicle itself.

3. A visor for the prevention of glare for use in automobiles, trucks and other windshield equipped vehicles comprising a flat resilient material provided with a transverse narrow slot terminating in an aperture, and having a plurality of similar apertures spaced along the path of the slot so that the slot runs through the apertures, the apertures being of suitable size and contour to frictionally engage the means in back of a rear view mirror connecting the mirror to the vehicle, whereby the visor may be frictionally mounted on the connecting means in the back of the mirror and prevent bright glare from coming in through the portion of the windshield about the mirror.

4. An article of the character described comprising a flat resilient non-transparent material provided with a transverse slot and apertures spaced and disposed along and through the slot, the size of the apertures being suitable to frictionally engage the means used for attaching a rear view mirror to the windshield frame, roof or other member of a windshield equipped vehicle.

5. The combination comprising a rear view mirror of the type used in motor vehicles, a stud connecting said mirror to the vehicle, a visor provided with a plurality of apertures each adapted to engage the stud, said visor also having a slot running transversely thereof through the apertures and terminating at one free edge of the visor, whereby the visor can be slipped over the stud through its slot and one of the apertures frictionally engage the stud in back of the mirror.

CHARLES A. SHORT, Sr.

REFERENCES CITED

The following references are of record in the file of this patent:

UNITED STATES PATENTS

| Number | Name | Date |
| --- | --- | --- |
| 1,488,986 | Hood | Apr. 1, 1924 |
| 2,163,495 | Levy | June 20, 1939 |
| 2,210,762 | Itzigson | Aug. 6, 1940 |